Patented Oct. 15, 1946

2,409,344

UNITED STATES PATENT OFFICE 2,409,344

PLASTICIZING CHLOROPRENE POLYMERS

Arnold R. Davis, Riverside, Conn., assignor to American Cyanamid Company, New York, N. Y., a corporation of Maine No Drawing. Application January 7, 1943,
Serial No. 471,605

12 Claims. (Cl. 260—36)

This invention relates to plasticizing polymers of chloroprene (chloro-2-butadiene-1,3).

It is known that certain products made by polymerizing chloro-2-butadiene-1,3 in the presence of sulfur may be plasticized by milling with diarylguanidines, organic sulfides, disulfides, aromatic mercaptans, dithiocarbamates, xanthates and the like. The unplasticized polymers are sometimes referred to under the trade name "Neoprene."

The plasticizing of Neoprene with chemical compounds outlined above has certain disadvantages such as high cost and, in the case of diarylguanidines, a prolonged aging period is required for maximum plasticity. Such disadvantages are obviously objectionable in the economical manufacture of finished products in as short a time as possible.

It is an object of the present invention to provide new and improved materials for increasing the plasticity of polymers of chloro-2-butadiene-1,3, particularly those polymers (or types of Neoprene) which can be plasticized by the prior art compounds referred to above. A further object is to render the Neoprene highly plastic without extensive milling.

These and other objects are attained by milling the chloroprene polymers with a small amount of organic base salts of disubstituted dithiophosphoric acids, said salts having the following formula:

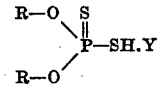

where R is alkyl, aryl or aralkyl, Y is selected from the group consisting of aliphatic secondary amines, aromatic primary amines, cycloaliphatic amines, heterocyclic imines and compounds having the following structural formula:

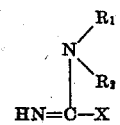

in which $R_1$ is hydrogen or like $R_2$, $R_2$ is hydrogen, an aromatic, thiazyl or an aliphatic radical, X is $-SR_3$, $-NH_2$, $-NHR_4$,

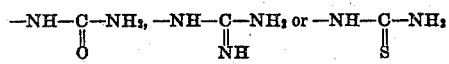

$R^3$ is an aliphatic radical and $R^4$ is an aromatic radical. These plasticizers include the guanidine, biguanide, guanylthiourea, isothiourea and diaryl guanidine salts of the disubstituted dithiophosphoric acids, the organic base being substituted for Y in the above formula:

To illustrate the effectiveness of the plasticizers of the present invention, a 400-gram sample of Neoprene GN was milled for a total time of 10 minutes on rolls with an initial temperature of 50° C. and the sample was then cooled to room temperature. This sample was used as a control. A similar sample of Neoprene GN was milled with the gradual addition thereto of a small amount of one of the plasticizers of the present invention, the rolls having an initial temperature of 50° C. and the total milling time being 10 minutes, the sample then being cooled to room temperature as before.

The milled samples were tested in a Williams plastometer for effectiveness of the compounds as plasticizers for the Neoprene. A 3-minute "Y" value in inches at 100° C. was employed for the tests. The lowest "Y" value indicates the softest or most plastic stock. The results obtained were as follows:

| | Percent plasticizer | "Y" value in inches |
|---|---|---|
| Neoprene GN—control | None | 0.100 |
| β-myristoyl ethoxy isothiourea dibutyl dithiophosphate | 0.5 | .079 |
| Guanidine dibutyl dithiophosphate | 0.5 | .068 |
| Guanylthiourea dibutyl dithiophosphate | 0.5 | .061 |
| Diorthotolyl guanidine dibutyl dithiophosphate | 0.5 | .072 |
| Mono phenyl guanidine dibutyl dithiophosphate | 0.5 | .070 |
| Bis (2 cyanoethyl) amine salt of dibutyl dithiophosphoric acid | 0.5 | .075 |
| Diphenyl guanidine di-isopropyl dithiophosphate | 0.5 | .070 |
| Aniline di-isopropyl dithiophosphate | 1.5 | .053 |
| p-Phenylene diguanidine salt of dibutyl dithiophosphoric acid | 0.5 | .070 |
| Aniline dibutyl dithiophosphate | 0.5 | .083 |
| Guanidine di-isopropyl dithiophosphate | 0.5 | .075 |
| Biguanide salt of dibutyl dithiophosphoric acid | 0.5 | .058 |
| Phenyl biguanide salt of dibutyl dithiophosphoric acid | 0.5 | .072 |
| Bis (ethoxypropyl) amine salt of dibutyl dithiophosphoric acid | 0.5 | .070 |
| Cyclohexyl amine salt of dibutyl dithiophosphoric acid | 0.5 | .068 |
| Piperidine salt of dibutyl dithiophosphoric acid | 0.5 | .066 |
| Phenyl biguanide bis dibutyl dithiophosphate | 0.5 | .074 |
| Phenyl biguanide diamyl tetra thiophosphate | 0.5 | .093 |
| Phenyl biguanide dibutyl dithiophosphate | 1.0 | .061 |
| Aniline-dicyandiamide-dibutyl dithiophosphoric acid reaction product | 1.5 | .057 |
| Phenyl biguanide di-isopropyl dithiophosphate | 1.5 | .056 |
| Aniline di-isopropyl dithiophosphate-dicyandiamide reaction product | 1.5 | .052 |

| | Percent plasticizer | "Y" value in inches |
|---|---|---|
| Bis (cyanoethyl) amine dibutyl dithiophosphate-dicyandiamide reaction product | 1.5 | 0.060 |
| Aminobenzothiazole dibutyl dithiophosphate-dicyandiamide reaction product | 1.5 | .062 |
| Acetyl ethoxy isothiourea diethyl dithiophosphate | 0.5 | .071 |
| Dilauryl dithiophosphoric acid-aniline-dicyandiamide reaction product | 1.5 | .058 |
| Amyl alcohol-methyl hexanol dithiophosphoric acid-aniline-dicyandiamide reaction product | 1.5 | .054 |
| Aniline-dicyandiamide-methyl hexanol dithiophosphoric acid reaction product | 1.5 | .055 |
| Bis (cyanoethyl) amine-dicyandiamide-methyl hexanol dithiophosphoric acid reaction product | 1.5 | .058 |
| Diorthotolyl guanidine-methyl hexanol dithiophosphate | 1.5 | .064 |
| Phenyl biguanide methyl hexanol dithio phosphate | 1.5 | .060 |
| Aniline-dicyandiamide-butyl ether of diethylene glycol dithiophosphoric acid reaction product | ¹1.0 | .072 |
| Reaction product of aniline-dicyandiamide-dithiophosphoric acid made from a mixture of amyl alcohol, palmitic acid and octadecanol | ¹1.0 | .060 |

¹ The initial roll temperature was 40° C. with these products.

It is apparent from the above tabulation that the salts of the dialkyl dithiophosphoric acids are effective plasticizers for chloroprene polymers. In the tabulation, the amount of plasticizer used is given in percent by weight based on the weight of Neoprene used in the formulation.

A portion of each of the plasticized rubber-like polymers was mixed with light magnesium oxide, carbon black, zinc oxide and an antioxidant and vulcanized in the conventional manner. The rubber-like flexible vulcanizates had good physical properties.

Aniline - dicyandiamide - disubstituted dithiophosphoric acid reaction products are believed to be the phenyl biguanide salts of the acids used and may be represented by the formula:

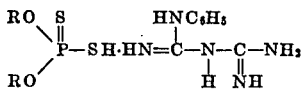

where F is alkyl, aryl or aralkyl as before. As pointed out in Application 471,606, the di-orthotolyl guanidine salt of dixylenol dithiophosphoric acid is also suitable as a softening agent.

The amount of softening agent employed may be varied and in general will be governed by the particular softening agent selected and the extent to which softening of the chloroprene polymers is desired. In general, the amount of plasticizer may be from about ½% to about 5% based on the weight of the chloroprene polymers. Larger amounts of the plasticizers may be used although, in general, excessive amounts above 5% do not give correspondingly increased plasticity.

These plasticizers are also valuable for use in reclaiming vulcanized and scrap Neoprene. The Neoprene is merely ground in a tight cold mill and then milled with about 2½% of the plasticizer on rolls at about 40°–50° C. until a suitable sheet is formed. The cured reclaim has almost the same properties as the original product. By mixing as much as 25% reclaim with 75% virgin Neoprene, products are obtaining possessing substantially the same physical properties as obtained with straight new Neoprene.

The plasticizers of the present invention may be prepared in any convenient manner but are preferably formed in accordance with the process set forth in my copending application Serial No. 471,606, filed January 7, 1943. These salts may include various long chain fatty acid radicals such as is obtained with the palmitic acid referred to in the last compound in the tabulation. Stearic, oleic, lauric and similar acids may be used in the same manner.

Suitable modifications and changes may be made in the invention without departing from the spirit and scope thereof, the foregoing description being intended only by way of illustration except as defined in the following claims.

I claim:

1. A process of softening a rubber-like chloroprene polymer which comprises mixing the polymer with a minor proportion of its weight of a salt of a dialkyldithiophosphoric acid and a salt-forming organic base selected from the group consisting of the aliphatic secondary amines, the mononuclear aromatic primary amines, the cycloaliphatic amines, piperidine, guanidine, the mono- and di- mononuclear aryl guanidines, biguanide, the mono- mononuclear aryl biguanides, guanylthiourea and isothiourea.

2. A process of softening a rubber-like chloroprene polymer which comprises mixing the polymer with about 0.5–5.0 percent of its weight of a salt of a dialkyldithiophosphoric acid and a salt-forming organic base selected from the group consisting of the aliphatic secondary amines, the mononuclear aromatic primary amines, the cycloaliphatic amines, piperidine, guanidine, the mono- and di- mononuclear aryl guanidines, biguanide, the mono- mononuclear aryl biguanides, guanylthiourea and isothiourea.

3. A method of softening a rubber-like chloroprene polymer which comprises mixing the polymer with a minor proportion of a phenyl-biguanide salt of a dialkyldithiophosphoric acid.

4. A method of softening a rubber-like chloroprene polymer which comprises mixing the polymer with a small amount of an organic base salt comprising an aniline-dicyandiamide-dialkyldithiophosphoric acid reaction product.

5. A method of softening a rubber-like chloroprene polymer which comprises mixing the polymer with a small amount of a phenyl biguanide salt of di(methylhexyl) dithiophosphoric acid.

6. A method of softening a rubber-like chloroprene polymer which comprises mixing the polymer with a small amount of an organic base salt comprising an aniline-dicyandiamide-di(methylhexyl) dithiophosphoric acid reaction product.

7. A rubber-like plastic mass comprising a mixture of a chloroprene polymer and a minor proportion of its weight of a salt of a dialkyldithiophosphoric acid and an organic salt forming base selected from the group consisting of the aliphatic secondary amines, the mononuclear aromatic primary amines, the cycloaliphatic amines, piperidine, guanidine, the mono- and di- mononuclear aryl guanidines, biguanide, the mono- mononuclear aryl biguanides, guanylthiourea and isothiourea.

8. A rubber-like plastic mass comprising a mixture of a chloroprene polymer and about 0.5–5.0 percent of its weight of a salt of a dialkyldithiophosphoric acid and an organic salt forming base selected from the group consisting of the aliphatic secondary amines, the mononuclear aromatic primary amines, the cycloaliphatic amines, piperidine, guanidine, the mono- and di- mononuclear aryl guanidines, biguanide, the mono- mononuclear aryl biguanides, guanylthiourea and isothiourea.

9. A rubber-like plastic mass comprising a mixture of a chloroprene polymer and a minor proportion of its weight of a phenyl biguanide salt of a dialkyldithiophosphoric acid.

10. A rubber-like plastic mass comprising a mixture of a chloroprene polymer and a minor proportion of its weight of a salt comprising an aniline - dicyandiamide - dialkyldithiophosphoric acid reaction product.

11. A rubber-like plastic mass comprising a mixture of a chloroprene polymer and a minor proportion of its weight of the phenylbiguanide salt of di-(methylhexyl)dithiophosphoric acid.

12. A rubber-like plastic mass comprising a mixture of a chloroprene polymer and a minor proportion of its weight of a salt comprising an aniline - dicyandiamide - di(methylhexyl)dithiophosphoric acid reaction product.

ARNOLD R. DAVIS.

Certificate of Correction

Patent No. 2,409,344.  October 15, 1946.

ARNOLD R. DAVIS

It is hereby certified that errors appear in the printed specification of the above numbered patent requiring correction as follows: Column 3, line 47, for the letter "F" read *R*; line 69, for the word "obtaining" read *obtained*; and that the said Letters Patent should be read with these corrections therein that the same may conform to the record of the case in the Patent Office.

Signed and sealed this 3rd day of February, A. D. 1948.

[SEAL]

THOMAS F. MURPHY,
*Assistant Commissioner of Patents.*